United States Patent
Tsai

(10) Patent No.: US 6,486,834 B2
(45) Date of Patent: Nov. 26, 2002

(54) ARRANGEMENT OF A PRINTED CIRCUIT BOARD-MOUNTED ANTENNA IN A PORTABLE ELECTRONIC DEVICE WITH A METALLIC HINGE BASE

(75) Inventor: Szu-Nan Tsai, Tu-Chen (TW)

(73) Assignee: Hon Hai Precision Ind. Co., Ltd., Taipei Hsien (TW)

(*) Notice: Subject to any disclaimer, the term of this patent is extended or adjusted under 35 U.S.C. 154(b) by 0 days.

(21) Appl. No.: 09/741,355

(22) Filed: Dec. 18, 2000

(65) Prior Publication Data

US 2002/0030628 A1 Mar. 14, 2002

(30) Foreign Application Priority Data

Aug. 1, 2000 (TW) .................................. 89115450 A

(51) Int. Cl.[7] .................................. H01Q 1/24
(52) U.S. Cl. .................. 343/702; 343/882; 343/906
(58) Field of Search ................. 343/702, 882, 343/906; H01Q 1/24

(56) References Cited

U.S. PATENT DOCUMENTS 5,926,139 A * 7/1999 Korisch ..................... 343/702

* cited by examiner

Primary Examiner—Michael C. Wimer
(74) Attorney, Agent, or Firm—Wei Te Chung

(57) ABSTRACT

An antenna assembly (20) is mounted on a metal hinge base (16) of an electronic device, and includes a printed circuit board (PCB) (22), an antenna (24), a metal sheet (26) and a coaxial cable (28). The PCB has a first surface (221) and a second surface (223) parallel to and spaced a distance from the first surface. The antenna and the metal sheet are respectively disposed on the first surface and the second surface of the PCB. The metal hinge base has a metal block (162) connecting with the metal sheet. The cable has a conductive core wire (282) and a ground shield (284) around the core wire. The core wire and the ground shield respectively electrically connect with the antenna and the metal sheet.

9 Claims, 6 Drawing Sheets

US 6,486,834 B2

ARRANGEMENT OF A PRINTED CIRCUIT BOARD-MOUNTED ANTENNA IN A PORTABLE ELECTRONIC DEVICE WITH A METALLIC HINGE BASE

FIELD OF THE INVENTION

The present invention relates to a printed circuit board-mounted antenna, and in particular to a printed circuit board-mounted antenna received in a portable electronic device.

BACKGROUND OF THE INVENTION

Antennas are usually used in portable electronic devices for receiving/sending signals. Antennas mounted within electronic devices often fail to communicate clearly due to EMI shielding protecting the interior of the electronic device. Communication is easier when the antenna is moved outside the electronic device. However, an antenna mounted to an exterior of the electronic device may have a shortened lifespan due to accidental damage from objects hitting the exterior.

Additionally, smaller size is required for electronic devices to meet the trend toward portability. Accordingly, parts within an electronic device, such as antennas, are required to be of small size. Conventional monopole antennas are generally oriented perpendicular to a reference ground in the electronic devices, and so occupy extra space.

An improved antenna, which minimizes the effects of EMI and which occupies a small space, is desired.

BRIEF SUMMARY OF THE INVENTION

A main object of the present invention is to provide a printed circuit board-mounted antenna for use in an electronic device which effectively prevents EMI.

Another object of the present invention is to provide a printed circuit board-mounted antenna which has small size and occupies a small space in the electronic device.

A printed circuit board-mounted antenna assembly according to the present invention comprises a printed circuit board (PCB) having opposite first and second surfaces, a coaxial cable, a flat antenna mounted on the first surface, and a metal sheet attached to the second surface. The first surface is parallel to and spaced a distance from the second surface. The cable includes a core wire and a ground shield surrounding the core wire. The core wire electrically connects with the antenna while the ground shield electrically connects with the metal sheet. A portable electronic device has a mainframe unit and a display unit rotatably mounted to a metal hinge base of the mainframe unit. The printed circuit board is fixed to the metal hinge base at a position such that the metal sheet electrically connects with the metal hinge base.

Other objects, advantages and novel features of the invention will become more apparent from the following detailed description when taken in conjunction with the accompanying drawings.

DETAILED DESCRIPTION OF INVENTION

Figure 1:
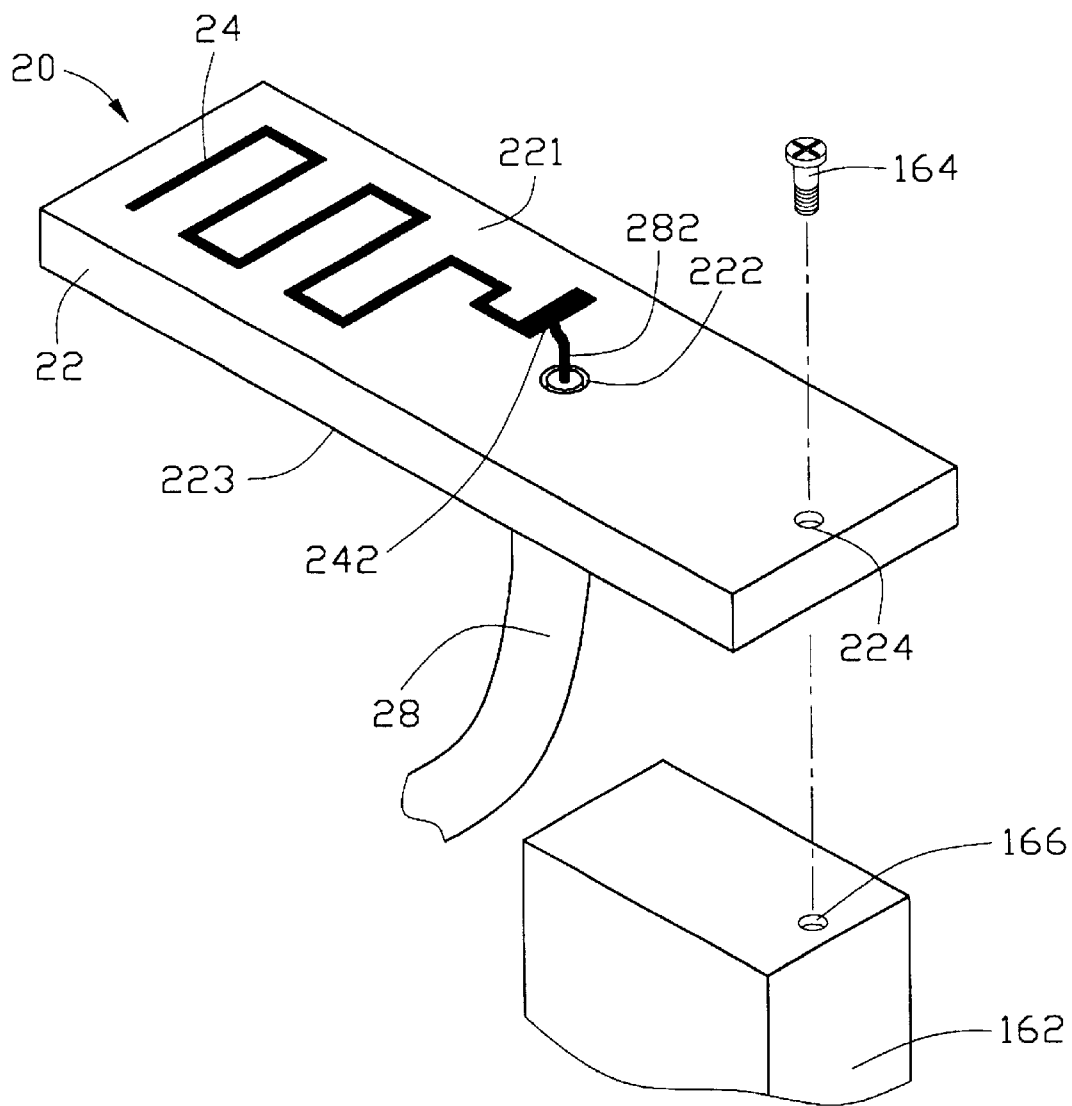
FIG. 1 is an exploded view of a printed circuit board-mounted antenna in accordance with the present invention and a metal block in a hinge base of a portable computer, wherein only a portion of the block is shown.
Figure 2:
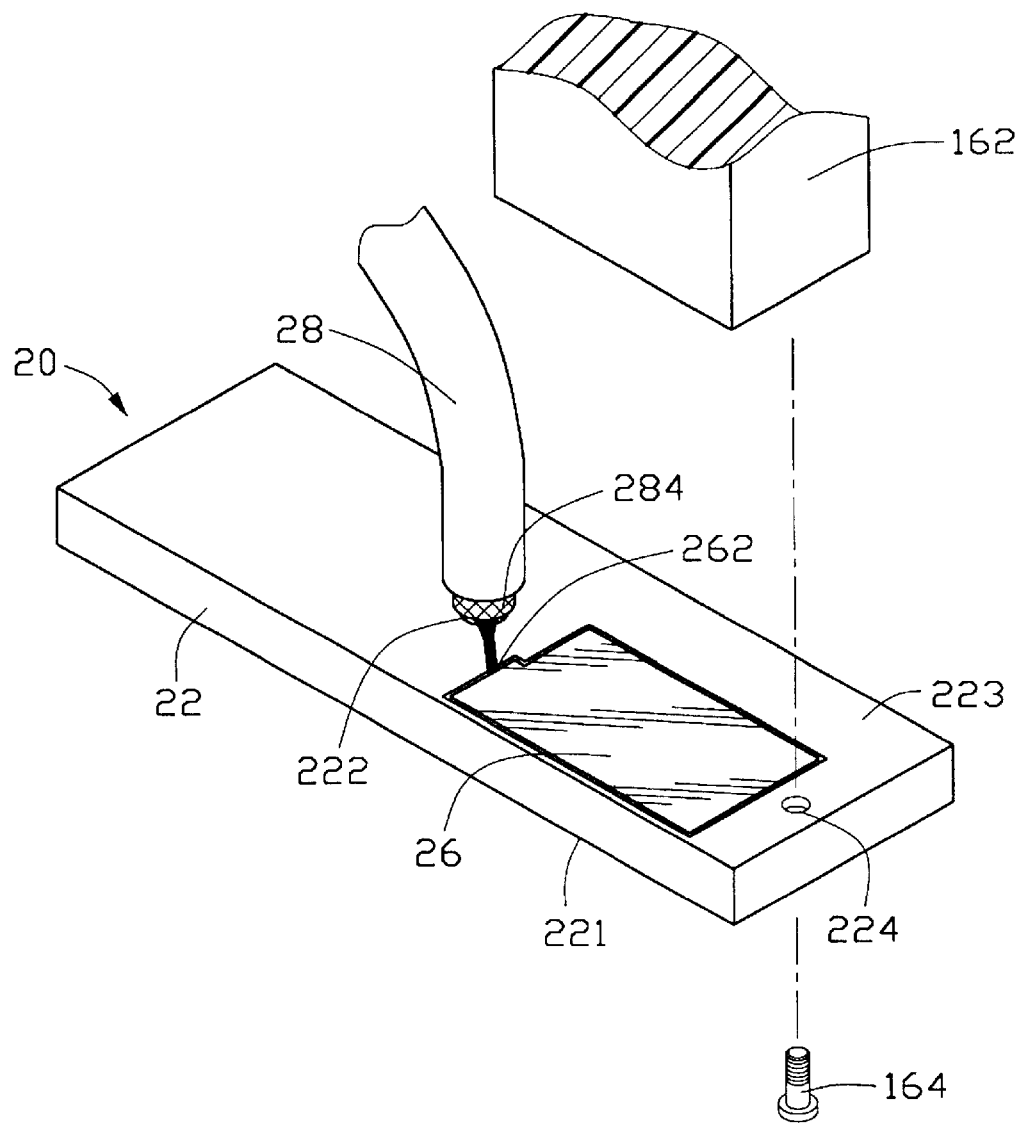
FIG. 2 is an upside-down view of FIG. 1.

Referring to the drawings and particularly to FIGS. 1 and 2, an antenna assembly 20 in accordance with the present invention comprises a printed circuit board (PCB) 22, a coaxial cable 28, a flat antenna 24 and a metal sheet 26.

The PCB 22 is substantially rectangular (for example, with a dimension of 26 mm×7 mm×0.8 mm) and comprises a first surface 221 and a second surface 223 parallel to and spaced a distance from the first surface 221. The antenna 24 is mounted to the first surface 221 along a rectangularsinuous course. The metal sheet 26 is substantially rectangular and is secured on the second surface 223 by gluing or printing, wherein the antenna 24 generally occupies a left side portion of the PCB 22 while the metal sheet 26 generally occupies a right side portion of the PCB 22. There is a space between the antenna 24 and the metal sheet 26. A circular aperture 222 is defined through the first and second surfaces 221, 223 and between the antenna 24 and the metal sheet 26. The PCB 22 further defines a through hole 224 between an edge of the PCB 22 and the metal sheet 26.

The cable 28 is connected adjacent and substantially perpendicular to the second surface 223 for transmitting signals between the antenna 24 and a signal processing circuit (not shown, since such circuits are well known in the art). The cable 28 comprises a conductive core wire 282 and a conductive ground shield 284 around the core wire 282. The core wire 282 is inserted through the second surface 223, the aperture 222 and the first surface 221 and is soldered to an inner extreme point 242 of the antenna 24 on the first surface 221. The ground shield 284 connects with the metal sheet 26 on the second surface 223 near an inner extreme point 262 of the metal sheet 26.

The cable 28 connects to the PCB 22 at a point betweeen the antenna 24 and the metal sheet 28. This arrangement enlarges the distance between points 242, 262, thereby obtaining an effective antenna system 20 in a compact manner. Some parameters of the antenna assembly 20, for example the Voltage Standing Wave Ratio (VSWR), are affected by the adjustments in the relative psoistions between the inner extreme point 242 and the inner extreme point 262 and changes in the parameters of the cable 28.

Figure 4:
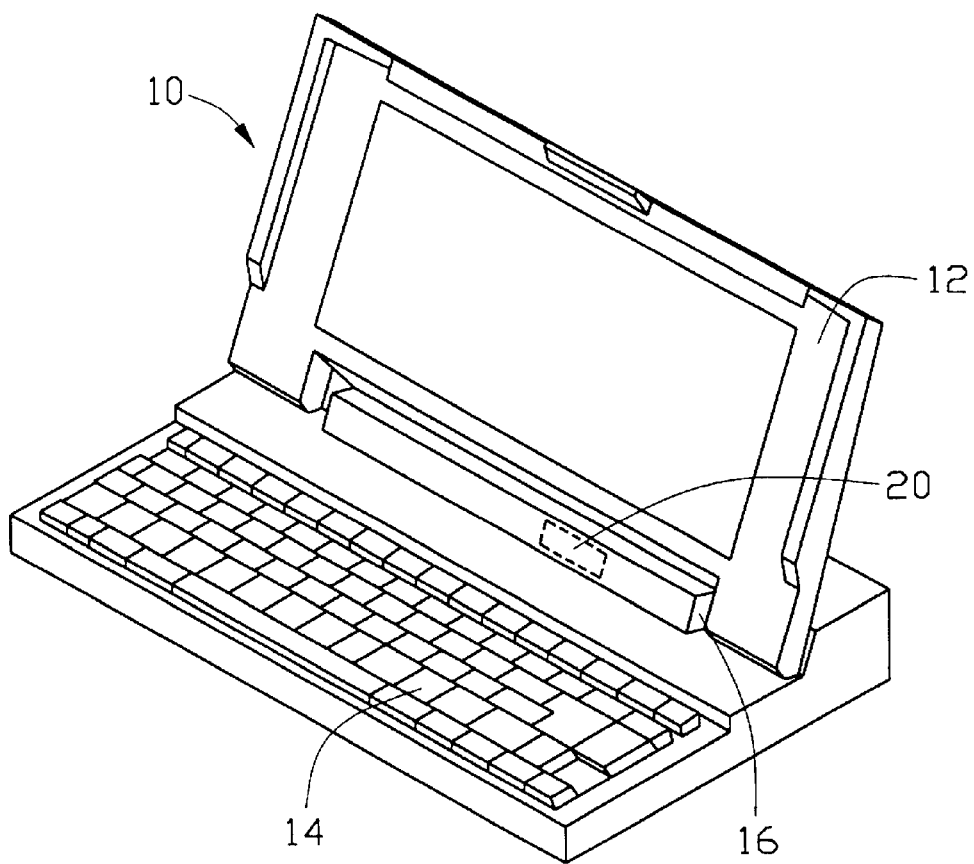
FIG. 4 is a perspective view of a portable computer on which the printed circuit board mounted antenna is mounted.

Referring to FIG. 4, a portable computer 10 comprises a mainframe unit 14, a hinge base 16 fixed to the unit 14 and a display unit 12 pivotably connected to the hinge base 16 so that the display unit 12 is rotatable with respect to the mainframe unit 14 between opened and closed positions. The hinge base 16 has a metal block 162 therein and close to an end thereof. The metal block 162 remains stationary while the display unit 12 rotates with respect to the mainframe unit 14. The metal block 162 defines a threaded hole 166 in an outer face thereof corresponding to the through hole 224 in the PCB 22, whereby the PCB 22 can be fixed to the block 162.

Figure 3:
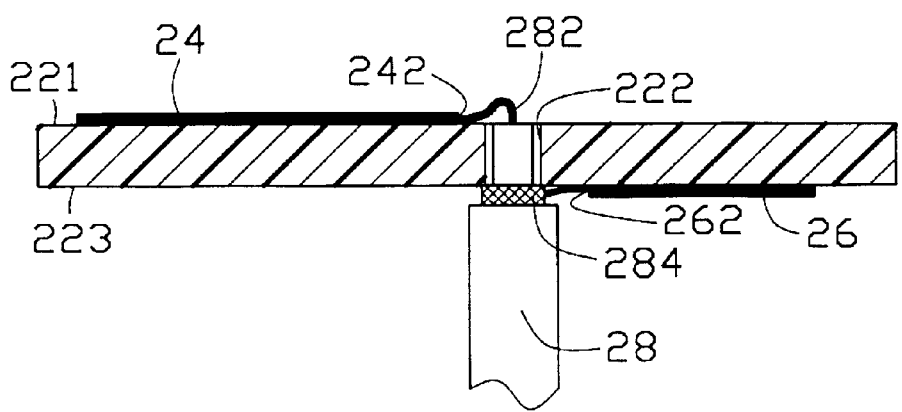
FIG. 3 is a cross-sectional view of the printed circuit board-mounted antenna of FIG. 1.

Referring to FIG. 2, the antenna assembly 20 is mounted onto the metal block 162 for wireless communication with various exterior devices (not shown) using the ISM (Industry, Science, Medicine) frequency band (2.4~2.5 GHz). The screw 164 (not shown in FIG. 3) extends through the through hole 224 of the PCB 22 and engages with the threaded hole 166 of the metal block 162. The metal sheet 26 of the PCB 22 abuts against and electrically connects with the metal block 162, whereby the metal block 162 acts as a cubic reference ground for the antenna assembly 20. This design eliminates the effects of EMI caused by the metal block 162 on the antenna assembly 20.

Figure 5:
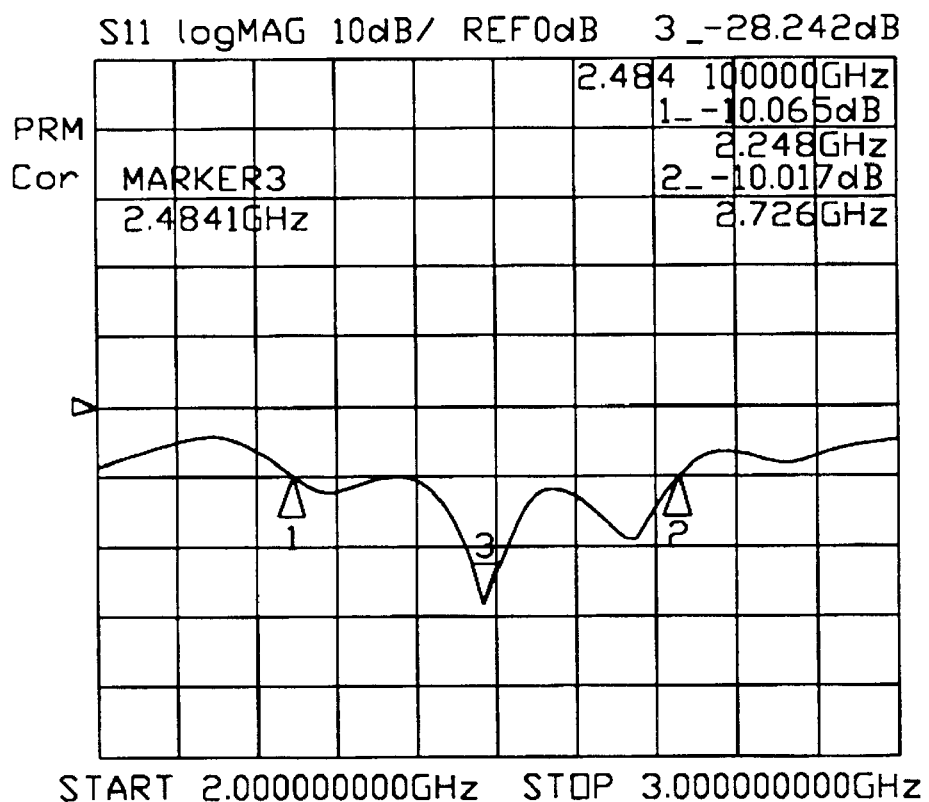
FIG. 5 is a diagram of experimental data, showing performance of the printed circuit board-nounted antenna when a display unit is open relative to a mainframe unit.

The experimental data of FIG. 5 were obtained when the display unit 12 of one portable computer 10 was open relative to the mainframe unit 14. The printed circuit board mounted antenna communicated in a frequency band 2.25~2.73 GHz, where the Reflection Loss was more than 10 dB.

Figure 6:
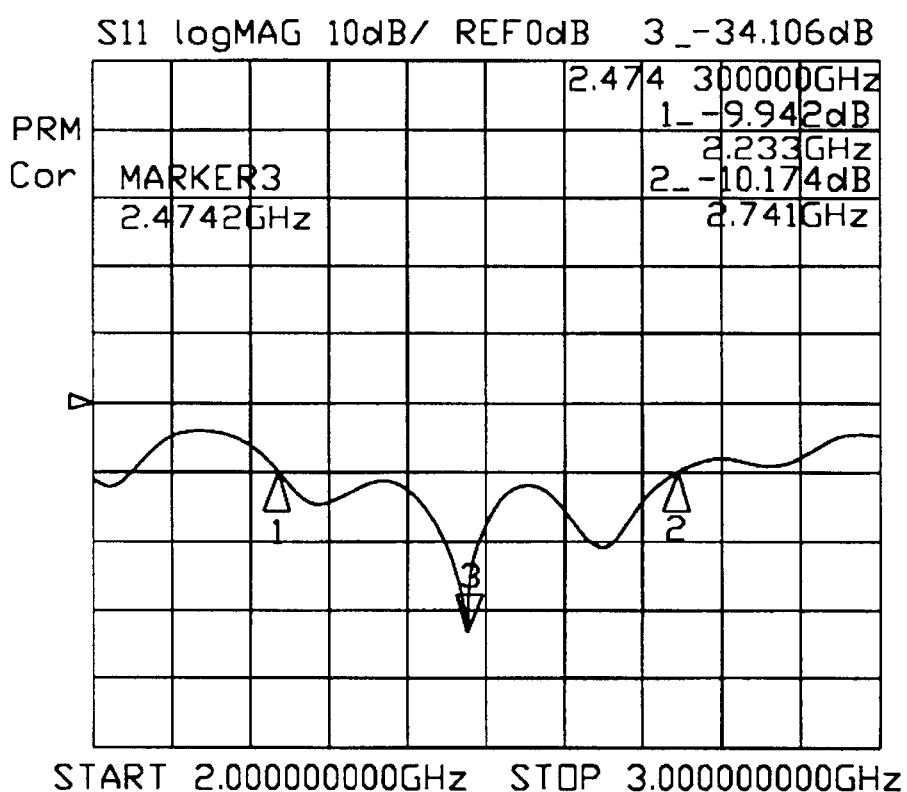
FIG. 6 is another diagram of experimental data, showing performance of the printed circuit board-mounted antenna when the display unit is closed relative to the mainframe unit.

The experimental data of FIG. 6 were obtained when the display unit 12 of the same portable computer 10 was closed relative to the mainframe unit 14. The printed circuit board mounted antenna communicated in the frequency band 2.23~2.74 GHz, where the Reflection Loss was more than 10 dB.

As shown in FIGS. 5 and 6, the Reflection Loss was more than 10 dB in the frequency band of 2.4~2.5 GHz, regardless of the relative position of the display unit 12 to the mainframe unit 14. In other words, the relative position of the display unit 12 to the mainframe unit 14 did not influence the performance of the antenna assembly 20.

An additional advantage is, the antenna assembly 20 is directly mounted on the hinge 16, thereby saving space occupied in the computer.

The antenna assembly 20 of the present invention can be used with various wireless communication protocols, such as Wireless LAN and Bluetooth.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invertion to the full extent indicated by the broad general meaning of the terms in which the appended claims are expressed.

I claim:

1. An antenna assembly used in a portable electronic device, comprising:
   a printed circuit board (PCB) having opposite first and second surfaces;
   a metal sheet attached to the second surface of the PCB, whereby said PCB is fixed to a metal hinge base of the portable electronic device at a position such that the metal sheet electrically connects with the metal hinge base;
   a flat antenna mounted on the first surface of the PCB; and
   a signal transmitting cable having a core wire electrically connecting with the antenna, and a ground shield surrounding the core wire electrically connecting with the metal sheet.

2. The antenna assembly as claimed in claim 1, wherein the first surface of the PCB is parallel to and spaced a distance from the second surface.

3. The antenna assembly as claimed in claim 1, wherein a circular aperture is defined through the first and second surfaces at a position between the antenna and the metal sheet, and wherein the core wire is inserted through the aperture, the second surface and the first surface to electrically connect with the antenna on the first surface.

4. The antenna assembly as claimed in claim 1, wherein the cable connects to the PCB at a point between the antenna and the metal sheet.

5. The antenna assembly as claimed in claim 1, wherein the PCB is mounted on a metal block of the hinge base of the portable electronic device via a fastener, and wherein the metal sheet abuts against and electrically connects with the metal block.

6. An antenna assembly adapted to mount on a metal hinge base of an electronic device, comprising:
   an antenna provided on a first surface;
   a ground means mounted on a second surface; and
   a coaxial cable including a core wire and a ground shield around the core wire, the core wire electrically connecting with the antenna, and the ground shield connecting with the ground means;
   wherein the ground means electrically connects with the metal hinge base.

7. The antenna assembly as claimed in claim 6, wherein the first surface is parallel to and spaced a distance from the second surface.

8. The antenna assembly as claimed in claim 6, wherein the ground means comprises a metal sheet glued or printed on the second surface.

9. An antenna assembly used in a portable electronic device comprising:
   a printed circuit board (PCB) having opposite first and second surfaces;
   a flat antenna mounted on the first surface;
   a grounding pad mounted on the second surface and adapted to be connected to a metal base of the device; and
   a signal transmission cable including a core wire extending from the second surface through an aperture of the printed circuit board to the first surface and connected to the flat antenna, and a ground shield surrounding the core wire terminating at the second surface without extending through the aperture but being connected to the grounding pad; wherein
   said metal base is used as a hinge base of said device.

* * * * *